Sept. 21, 1965 T. WATT 3,207,477
SNATCH BLOCK
Filed May 6, 1963 2 Sheets-Sheet 1
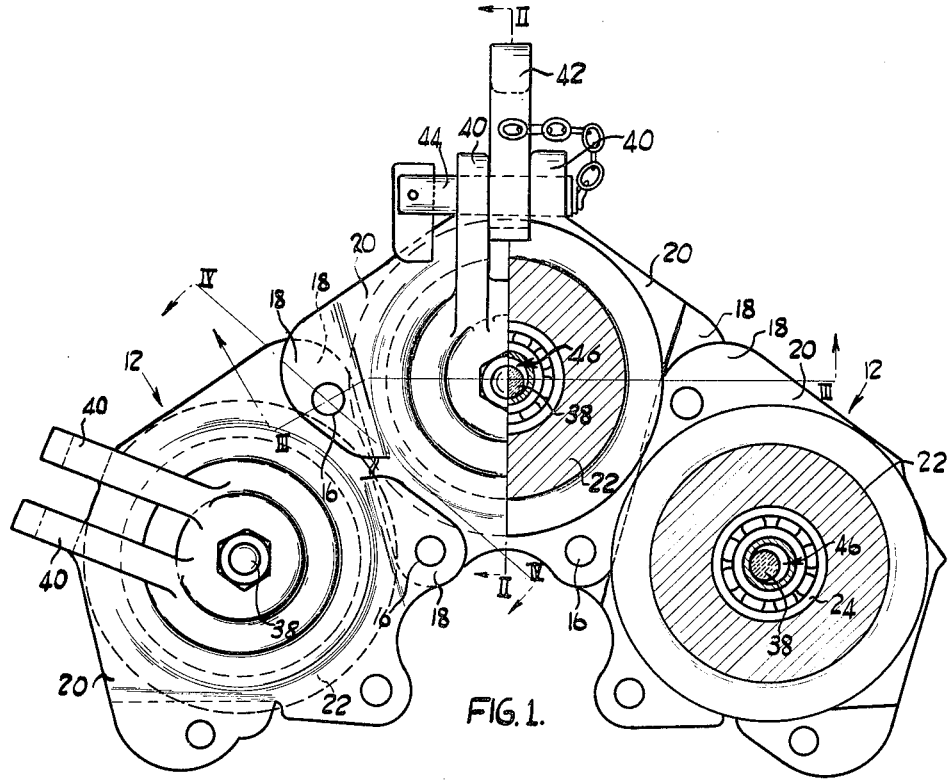
FIG. 1.
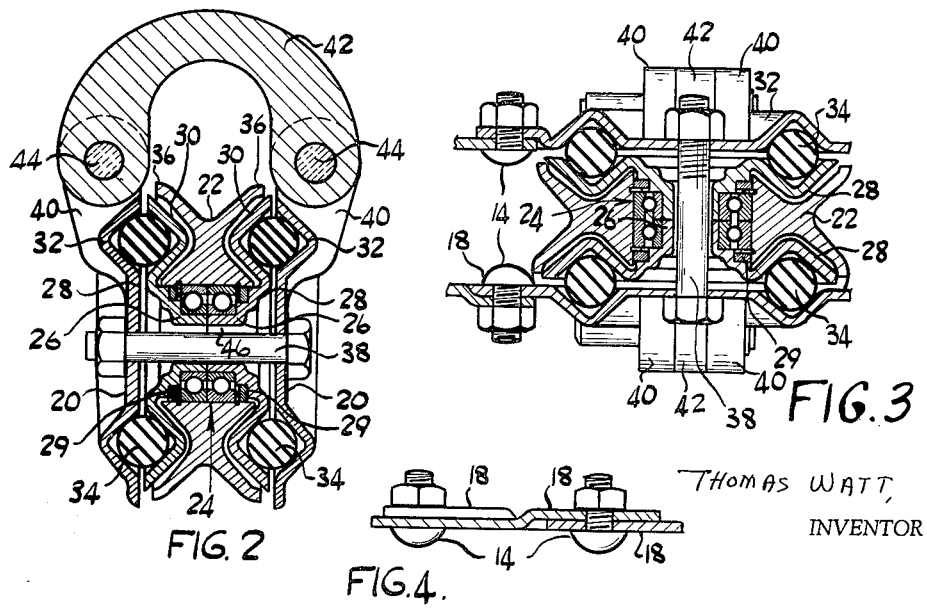
FIG. 2  FIG. 3
FIG. 4.
THOMAS WATT,
INVENTOR
BY Wenderoth, Lind and
Ponack, ATTORNEYS Sept. 21, 1965  T. WATT  3,207,477
SNATCH BLOCK
Filed May 6, 1963  2 Sheets-Sheet 2
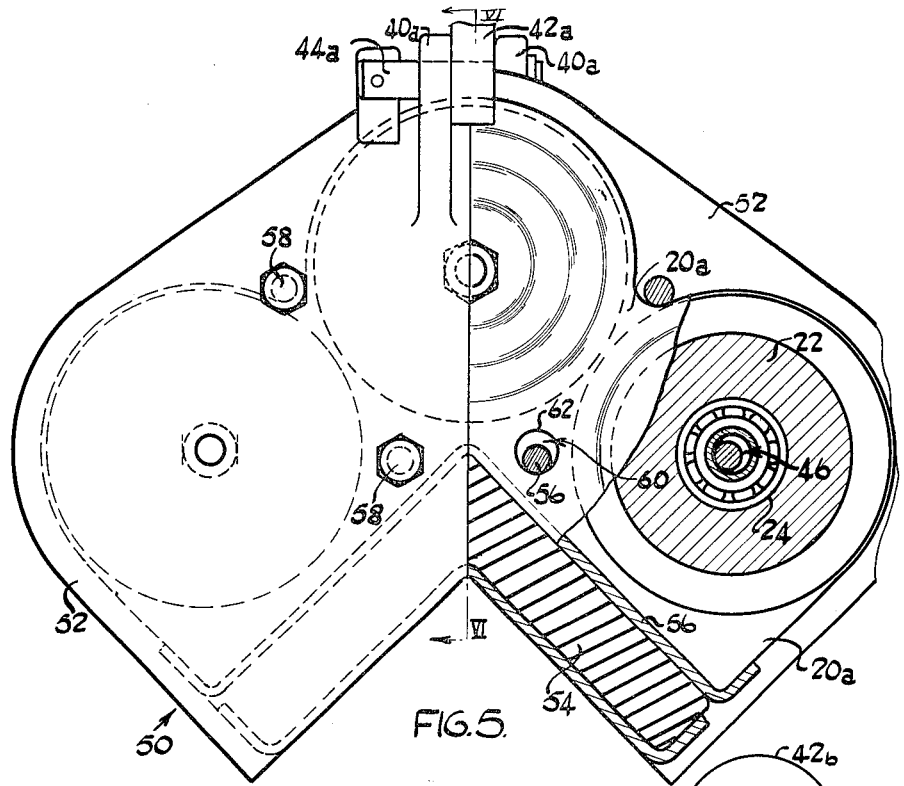
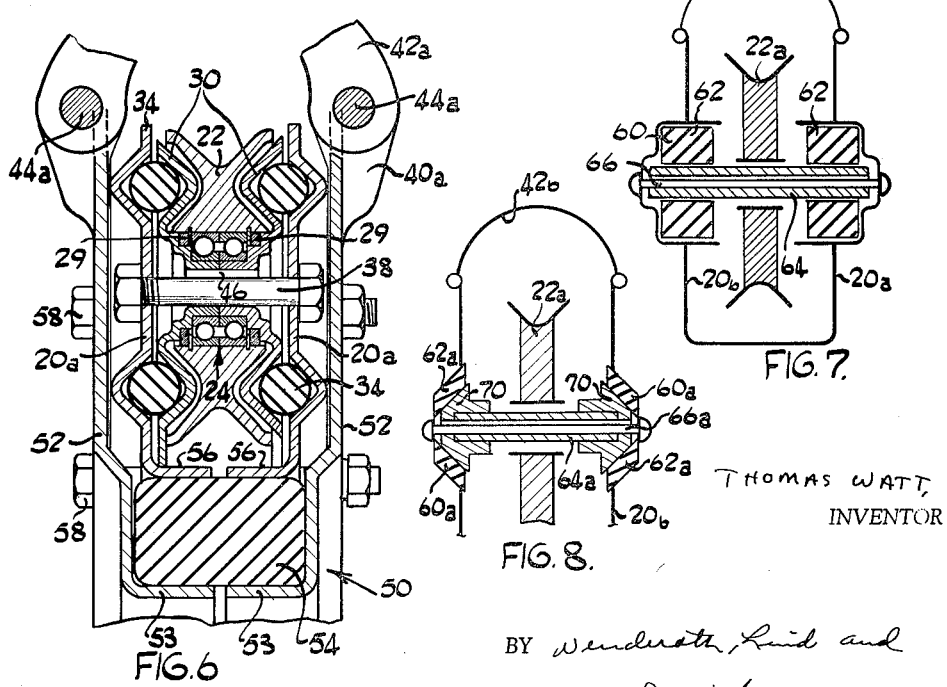
THOMAS WATT,
INVENTOR
BY Wendroth, Lind and Ponack, ATTORNEYS United States Patent Office 3,207,477
Patented Sept. 21, 1965

3,207,477
SNATCH BLOCK
Thomas Watt, 70 10th Ave., Johannesburg, Transvaal,
Republic of South Africa
Filed May 6, 1963, Ser. No. 278,067
Claims priority, application Republic of South Africa,
May 11, 1962, 62/1,990
14 Claims. (Cl. 254—197)

This invention relates to sheave blocks, and in particular to sheave blocks suitable for use with steel wire rope as flexible elements.

According to the invention a sheave block includes at least one sheave having a hollow axle and mounted to rotate about the axis of the axle, a pair of axially spaced cheek plates one on either side of the sheave and having each a seat around the axis, resilient rings in the seats and resiliently supporting the axle relative to the cheek plates, and spacing means in the form of a tie bar passing through the cheek plates and through the bore of the hollow axle to limit the outward axial spacing of the cheek plates.

The axle may comprise: a pair of axle members each member having a hollow journal part, and an outwardly facing seat part coaxial with the journal part and of larger diameter than the journal part. The cheek plates may be spaced outside the axle members and the seat parts may be ring-like and may face inwardly to register with the seat parts of the axle members; the sheave being mounted to rotate on the journal parts between the outwardly facing seat parts and the resilient rings seating within the registering seat parts of axle members and cheek plates thereby supporting the axle members resiliently in the cheek plates.

The sheave may have two rims projecting axially outwardly and may have axially recessed regions below its rims, the seat parts of the axle members fitting with clearance into these recessed regions.

The spacing means may include a bolt passing through the hollow journals, the bolt pressing on the cheek plates to press the resilient rings into their seats. Clearance may be provided between the bolt and the hollow journals to permit displacement under load of the sheave and axle members relative to the cheek plates.

Each cheek plate may have at least one ear having a hole whereby a composite sheave block may be made by bolting the ears of a plurality of sheave blocks together via the registering holes in the ears. Alternatively, each cheek plate may have at least one pair of axially staggered ears and spaced transversely to the sheave axis, the ears having holes for registering with holes of another similar cheek plate of another similar sheave block; whereby a composite sheave block may be made up by mating a plurality of sheave blocks, by bolting the ears of the sheave blocks together via registering holes in the ears. The one ear may be substantially in line with the sheave axis.

The sheave block may include hanging means comprising a bridge piece spanning the space between the cheek plates and pivotally connected to the cheek plates about axes transverse to the sheave axis.

The sheave block may include a stirrup member having a cushion seat, a resilient cushion in the seat, and hanging means connected to the stirrup member, the cheek plates seating resiliently on the cushion. The stirrup member may comprise a pair of axially spaced side plates, and axial locating means for locating them axially in position relative to each other, and the hanging means may comprise a bridge piece spanning the space between the side plates and pivotally connected to them about axes transverse to the sheave axis.

A sheave block may include three sheaves each having an axle and mounted to rotate about parallel axes disposed at the apices of an isosceles triangle, a pair of axially spaced cheek plates one on either side of the sheaves, each cheek plate having a seat around the axis of each sheave, rings in the seats and resiliently supporting the axles relative to the cheek plates, spacing means to limit the outward axial spacing of the cheek plates, and hanging means above the apex of the triangle to suspend the sheave block.

Further features of the invention will become apparent from the following description with reference to the accompanying drawings.

In the drawings:

FIGURE 1 shows a part-sectional side elevation of a composite sheave block in accordance with the invention;

FIGURE 2 shows a sectional front elevation of a single sheave block, at II—II in FIGURE 1 of the drawings;

FIGURE 3 shows an axial section taken at III—III in FIGURE 1 of the drawings;

FIGURE 4 shows a part section of a pair of mating cheek plates, at IV—IV in FIGURE 1;

FIGURE 5 shows a part-sectional side elevation of another embodiment of the invention;

FIGURE 6 shows a part-sectional front elevation at VI—VI of FIGURE 5 of the drawings;

FIGURE 7 shows diagramatically a sectional front elevation of a further embodiment of the invention; and FIGURE 8 shows diagramatically a sectional front elevation of yet a further embodiment of the invention.

Referring to FIGURES 1 to 4 of the drawings, reference numeral 10 refers generally to a composite sheave block comprised of sheave blocks 12 bolted together via bolts 14 through registering holes 16 in staggered ears 18 of axially spaced cheek plates 20.

The cheek plates 20 are arranged in pairs, spaced laterally, and have between them a sheave 22 mounted to rotate on bearings 24 carried by the hollow journal parts 26 of axle members 28 having outwardly facing seat parts 30. The cheek plates have inwardly facing seat parts 32 registering with the seat parts 30 of the axle members 28. A cavity is defined between the registering seat parts of each axle member and cheek plate pair, and there is provided a resilient ring 34 within each such cavity. Seals 29 are provided between the axle members 28 and the bearings 24. These seals serve to retain lubricant within the cavity housing of the bearings.

The sheave has rims 36 projecting axially outwardly but having axially recessed regions below these rims, within which the seat parts of the axial members are adapted to fit with clearance.

The outward axial spacing of the cheek plates is limited by means of a bolt 38, passing with clearance through the hollow journal parts 26 of the axle members 28. The rings 34 are thereby pressed into their seats and are maintained under compression by means of bolt 38.

Each cheek plate is provided with a pair of suspension ears 40, spaced transversely to the axis of the sheave. A bridge piece 42 is provided which spans the space between the cheek plates 20, and which is pivotally connected to them by means of pins 44, having their axes disposed transversely to the sheave axis.

The composite block shown in FIGURE 1 of the drawings is made up of three identical blocks, but of course the bridge piece 42 need only be provided on the centre block if desired.

In use, a flexible element such as a steel wire rope, a chain, or the like, will pass around the three sheaves 22 of the composite block. The load imposed by the flexible element will impose a shear load on the rings 34, which will permit resilient displacement of the axle members 28, because of the clearance 46 provided between the bolts 38 and the bores of the hollow journal parts 26 of the axle members 28.

This construction makes it possible for the resilient rings 34 to be compressed under no load, and this is favorable for long life when they are made of rubber, because then the rings do not become completely relaxed.

Referring now to the embodiment of the invention shown in FIGURES 5 and 6 of the drawings, there is shown a pair of cheek plates 20a spaced axially, and supporting three sheaves mounted to rotate about parallel axes disposed at the apices of an isosceles triangle. There is also provided a stirrup member generally designated by reference numeral 50, and comprising a pair of side plates 52 spaced axially and having inwardly turned flanges 53, and defining a cushion seat between them. There is provided a resilient cushion 54, disposed within the seat. The cheek plates 20a have inwardly turned flanges 56, and seat between the side plates 52 on the resilient cushion 54. The side plates 52 are axially located in position by means of bolts 58, passing with clearance 60 (see FIGURE 5) through holes 62 in cheek plates 20a. Each side plate 52 is further provided with a pair of suspension ears 40a spaced transversely to the axis of the uppermost sheaves. A bridge piece 42a is connected pivotally to these ears by means of pins 44a having their axes disposed transversely to the axes of the sheaves.

Clearance is provided between the cheek plates 20a and the side plates 52 of the stirrup member, permitting displacement of the cheek plates under load, transversely to the axes of the sheaves. In this arrangement therefore, not only are the sheaves resiliently mounted between the cheek plates, but the cheek plates themselves are resiliently mounted within the stirrup member. The cushion 54, therefore, provides additional resilience to the block under load.

In practice, by a suitable choice of dimensions, various parts of the block shown in FIGURES 1 to 4 on the drawings may be made to be interchangeable with the sheave block shown in FIGURES 5 and 6 of the drawings.

Referring now to FIGURE 7 of the drawings, there is shown diagrammatically, a pair of axially spaced cheek plates 20b having end caps 60, within which resilient bushes 62 are mounted. A hollow axle 64 is mounted within the bushes, and support sheave 22a rotatably about its axis. The end caps 60 are drawn tightly against the sides of the cheek plates 20b by means of a bolt or rivet 66 passing with clearance through the hollow axle 64. In this embodiment also, a bridge piece 42b is provided, pivotally connected to the cheek plates 20b about a pair of axially spaced transverse axes, similar to the arrangement already described.

Referring now to FIGURE 8 of the drawings, the arrangement is very much like that of FIGURE 7, except that frusto-conical end caps 60a and frusto-conical resilient bushes 62a, having frusto-conical bores, as well as seating members 70, are provided. The seating members 70 are adapted to fit over the ends of the axle 64a and are adapted to seat within the frusto-conical bores of the resilient bushes 62a. In this embodiment, the end caps 60a are drawn tightly against the resilient bushes 62a on the seating members 70 by means of a bolt or rivet 66a passing with clearance through the hollow axle 64a and through bores provided at the ends of the seating members 70. A bridge piece 42b, similar to that described with reference to FIGURE 7, is also provided.

It will be clear that the embodiments described in FIGURES 7 and 8 of the drawings also provide resilient support to the sheaves. It is also possible, in the embodiment shown in FIGURE 8, to place the resilient bushes 62a under initial compression, thereby ensuring a long life if they are of rubber because then they will not be relaxed, even under no load.

An advantage of sheave blocks made in accordance with the invention, is that the sheaves are adapted to take shock loads resiliently, thereby lessening the danger of fracture of the sheaves or the flexible elements used with them.

I claim:
1. A sheave block which includes at least one sheave having a hollow axle and mounted to rotate about the axis of the axle, a pair of axially spaced cheek plates one on either side of the sheave and having each a seat around the axis, resilient rings in the seats and resiliently supporting the axles relative to the cheek plates, and spacing means in the form of a tie bar passing through the cheek plates and through the bore of the hollow axle to limit the outward axle spacing of the cheek plates.

2. A sheave block which includes at least one sheave having an axle and mounted to rotate about the axis of the axle, a pair of axially spaced cheek plates, one on either side of the sheave and having each a seat around the axis, resilient rings in the seats and resiliently supporting the axle relative to the cheek plates, and spacing means to limit the outward axial spacing of the cheek plates, and in which the axle comprises: a pair of axle members each member having a hollow journal part, and an outwardly facing seat part coaxial with the journal part and of larger diameter than the journal part; and in which the cheek plates are spaced outside the axle members and in which the seat parts are ring-like and face inwardly to register with the seat parts of the axle members; the sheave being mounted to rotate on the journal parts between the outwardly facing seat parts and the resilient rings seating within the registering seat parts of axle members and cheek plates thereby supporting the axle members resiliently in the cheek plates.

3. A sheave block according to claim 2 in which the sheave has two rims and has axially recessed regions below its rims and in which the seat parts of the axle members fit with clearance into these recessed regions.

4. A sheave block according to claim 2 in which the spacing means includes a bolt passing through the hollow journals and pressing on the cheek plates to press the resilient rings into their seats.

5. A sheave block according to claim 4 in which clearance is provided between the bolt and the hollow journals to permit displacement under load of the sheave and axle members relative to the cheek plates.

6. A sheave block according to claim 1 in which each cheek plate has at least one ear having a hole whereby a composite sheave block may be made by bolting the ears of a plurality of sheave blocks together next to one another via the registering holes in the ears so that the sheave axes of the blocks are laterally spaced from one another.

7. A sheave block which includes at least one sheave having an axle and mounted to rotate about the axis of the axle, in pair of axially spaced cheek plates one on either side of the sheave and having each a seat around the axis, resilient rings in the seats and resiliently supporting the axle relative to the cheek plates, and spacing means to limit the outward axial spacing of the cheek plates, and in which each cheek plate has at least one pair of axially staggered ears and spaced transversely to the sheave axis, the ears having holes for registering with holes of another similar cheek plate of another similar sheave block; whereby a composite sheave block may be made up by mating a plurality of sheave blocks by bolting the ears of the sheave blocks together via registering holes in the ears.

8. A sheave block according to claim 7 in which the ears are circumferentially spaced about the sheave axis.

9. A sheave block which includes at least one sheave having an axle and mounted to rotate above the axis of axle, a pair of axially spaced cheek plates one on either side of the sheave and having each a seat around the axis, resilient rings in the seats and resiliently supporting the axle relative to the cheek plates, and spacing means to limit the outward axial spacing of the cheek plates, and in which there is provided a stirrup member having a cushion seat, a resilient cushion in the seat, and hanging means connected to the stirrup member, the cheek plates seating resiliently on the cushion.

10. A sheave block according to claim 9 in which the stirrup member comprises a pair of axially spaced side plates, and axial locating means for locating them axially in position relative to each other, and in which the hanging means comprises a bridge piece spanning the space between the side plates and pivotally connected to them about axes transverse to the sheave axis.

11. A sheave block which includes three sheaves each having a hollow axle and mounted to rotate about parallel axes disposed at the apices of an isosceles triangle, a pair of axially spaced cheek plates one on either side of the sheaves, each cheek plate having a seat around the axis of each sheave, rings in the seats and resiliently supporting the axles relative to the cheek plates, spacing means in the form of a tie bars, one for each hollow axle, and passing through the cheek plates and with clearance through the bores of the hollow axles so that radial clearances are defined between the peripheries of the tie bars and the bores of the hollow axles through which they pass to limit the outward axial spacing of the cheek plates, and hanging means above the apex of the triangle to suspend the sheave block.

12. A sheave block which includes three sheaves each having an axle and mounted to rotate about parallel axes disposed at the apices of an isosceles triangle, a pair of axially spaced cheek plates one on either side of the sheaves, each cheek plate having a seat around the axis of each sheave, rings in the seats and resiliently supporting the axles relative to the cheek plates, spacing means to limit the outward axial spacing of the cheek plates, and having means above the apex of the triangle to suspend the sheave block, the hanging means forming part of a stirrup member provided, the stirrup member having a cushion seat below the hanging means, and a resilient cushion in the seat, the cheek plates seating resiliently on the cushion.

13. A sheave block according to claim 12 in which the cushion and seat are of inverted V-shape in side elevation, such that the cushion is substantially the same distance from the three sheaves.

14. A sheave block according to claim 11 in which the clearances between the tie bars and the bores of the hollow axles are provided outside a circle passing through the axes of the three tie bars.

References Cited by the Examiner

UNITED STATES PATENTS

| 769,998 | 9/04 | Foote | 254—192 |
| 2,464,451 | 3/49 | Keeney | 254—194 |
| 2,653,063 | 9/53 | Arndt | 308—184 |
| 3,050,286 | 8/62 | Seamans | 254—195 |

FOREIGN PATENTS 615,802  10/26  France.

SAMUEL F. COLEMAN, *Primary Examiner.*